United States Patent
Mowatt et al.

(10) Patent No.: US 11,443,267 B2
(45) Date of Patent: Sep. 13, 2022

(54) INTELLIGENT EDGE STATE OPTIMIZATION WITHIN ENTERPRISE WITH ZERO DATA EXHAUST

(71) Applicant: Microsoft Technology Licensing, LLC, Redmond, WA (US)

(72) Inventors: David Mowatt, Dalkey (IE); Venkat Pradeep Chilakamarri, Seattle, WA (US); Ramesh Thimmarajarasu Bangalore, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 35 days.

(21) Appl. No.: 17/075,555

(22) Filed: Oct. 20, 2020

(65) Prior Publication Data
US 2022/0122008 A1    Apr. 21, 2022

(51) Int. Cl.
*G06Q 10/00*    (2012.01)
*G06Q 10/06*    (2012.01)
(Continued)

(52) U.S. Cl.
CPC ..... *G06Q 10/067* (2013.01); *G06F 16/24556* (2019.01); *G06F 16/285* (2019.01);
(Continued)

(58) Field of Classification Search
None
See application file for complete search history.

(56) References Cited

U.S. PATENT DOCUMENTS 10,241,772 B1 *    3/2019    Ning ............... G06F 16/24578
2006/0161444 A1 *  7/2006    Lubrecht .......... G06Q 10/06395
                                          705/7.41
(Continued)

FOREIGN PATENT DOCUMENTS

WO    2014018425 A2    1/2014

OTHER PUBLICATIONS

Jackson, Dominique, How to Use Cohort Analysis to ReduceChurn & Improve Retention, Apr. 20, 2020, Baremetrics.com, https://baremetrics.com/blog/cohort-analysis, p. 1-36. (Year: 2020).*
(Continued)

*Primary Examiner* — Joseph M Waesco
(74) *Attorney, Agent, or Firm* — Schwegman Lundberg & Woessner, P.A.

(57) ABSTRACT

Systems and methods for optimizing application experiences on devices in an enterprise while maintaining privacy compliance are provided. An enterprise model management service of the enterprise accesses, from a centralized software service, a model comprising one or more rules to be applied to an application. The model is provided to devices of a first cohort, whereby a rule of the model causes an action associated with the application to occur at each device. User metrics associated with the action at each device of the first cohort is aggregated. The user metrics indicate a result of the action at each device. The aggregated user metrics are analyzed, whereby the analyzing includes determining a second cohort at the enterprise. The model is then provided to devices of at least a portion of the second cohort. No user metrics are returned to the centralized software service thus maintaining privacy compliance.

20 Claims, 6 Drawing Sheets

(51) Int. Cl.
*G06F 16/28* (2019.01)
*G06F 16/2455* (2019.01)
*G06Q 10/10* (2012.01)
*G06Q 30/00* (2012.01)
*G06Q 30/02* (2012.01)
*G06Q 10/04* (2012.01)
*G06Q 50/26* (2012.01)

(52) U.S. Cl.
CPC ....... *G06Q 10/105* (2013.01); *G06Q 30/0185* (2013.01); *G06Q 30/0201* (2013.01); *G06Q 30/0205* (2013.01); *G06Q 10/04* (2013.01); *G06Q 10/06395* (2013.01); *G06Q 50/265* (2013.01)

(56) References Cited

U.S. PATENT DOCUMENTS

| | | | | |
|---|---|---|---|---|
| 2006/0161879 A1* | 7/2006 | Lubrecht | ................ | G06Q 10/06 717/101 |
| 2006/0271341 A1* | 11/2006 | Brown | ..................... | G06F 8/20 703/1 |
| 2012/0201133 A1* | 8/2012 | Raleigh | ............ | G06Q 10/06315 370/230 |
| 2014/0373032 A1* | 12/2014 | Merry | ....................... | G06F 9/54 719/328 |
| 2015/0033362 A1* | 1/2015 | Mau | .................... | G06F 16/5866 726/27 |
| 2015/0302182 A1* | 10/2015 | Wyatt | ................ | G06Q 30/0185 726/26 |
| 2017/0116552 A1* | 4/2017 | Deodhar | ............ | G06Q 10/0639 |
| 2018/0137139 A1* | 5/2018 | Bangalore | ........... | G06F 16/2379 |
| 2019/0147469 A1* | 5/2019 | Hu | ........................ | G06F 16/353 705/7.34 |
| 2019/0361917 A1* | 11/2019 | Tran | ....................... | G06Q 40/04 |
| 2020/0380417 A1* | 12/2020 | Briancon | ................. | G06N 5/04 |

OTHER PUBLICATIONS

"International Search Report and Written Opinion Issued in PCT Application No. PCT/US21/045628", dated Nov. 3, 2021, 14 Pages.

* cited by examiner

INTELLIGENT EDGE STATE OPTIMIZATION WITHIN ENTERPRISE WITH ZERO DATA EXHAUST

TECHNICAL FIELD

The subject matter disclosed herein generally relates to special-purpose machines that facilitate optimizing usage of resources, and to the technologies by which such special-purpose machines become improved compared to other machines that optimize usage of resources. Specifically, the present disclosure addresses systems and methods that intelligently optimize usage of resources and optimizes experiences with applications or services within an enterprise while maintaining privacy compliance.

BACKGROUND

Initially with modern computing, users were able to install applications that contained logic (e.g., rule sets) hardcoded by a computer programmer to make the user or their devices more efficient. Due to limitations of Internet bandwidth and processing power, the rules were typically hardcoded within an application, and intelligence was generally limited to stopping a particular rule from running. Updates may be provided through the Internet on a periodic basis, but done in a "one way" manner, such that the metrics of whether rules were effective or not may not be sent back to the rule provider (e.g., a software service). For example, a list of applications in an application launching menu may have shown applications in alphabetical order or logic as to whether an application should be installed may be limited to a simple consideration such as whether sufficient hard disk space was available.

Twenty years later, modern cloud services have become great at providing intelligent experiences. In the most common form, they do this by recording information about millions of users of a cloud service. This lets software companies or services create a learned model based on that rich information. It also enables the software companies or services to provide a given user with a tuned experience because the cloud service has access to very rich data about that user. The software companies can compare that user's data to the model and use the comparison to tune what the user sees to deliver optimized experiences.

The challenge is that the user needs to agree to let the software company or service in question have access to information about them and a history of what actions the user has taken in the application or service. This approach leaves the door open to intentional or unintentional mishandling of private user data. Furthermore, laws will increasingly limit the reach and ability of most traditional targeting systems. The challenge is how organizations can have the best of both worlds—improved tuning (intelligence) of rules and actions by being able to analyze many users' behavior, but in a way that does not make employers or other entities contravene data privacy policies that protect their employees' or users' data from being sent to the software company or service (e.g., large information technology companies).

BRIEF DESCRIPTION OF DRAWINGS

Various ones of the appended drawings merely illustrate example embodiments of the present invention and cannot be considered as limiting its scope.

DETAILED DESCRIPTION

Figure 1:
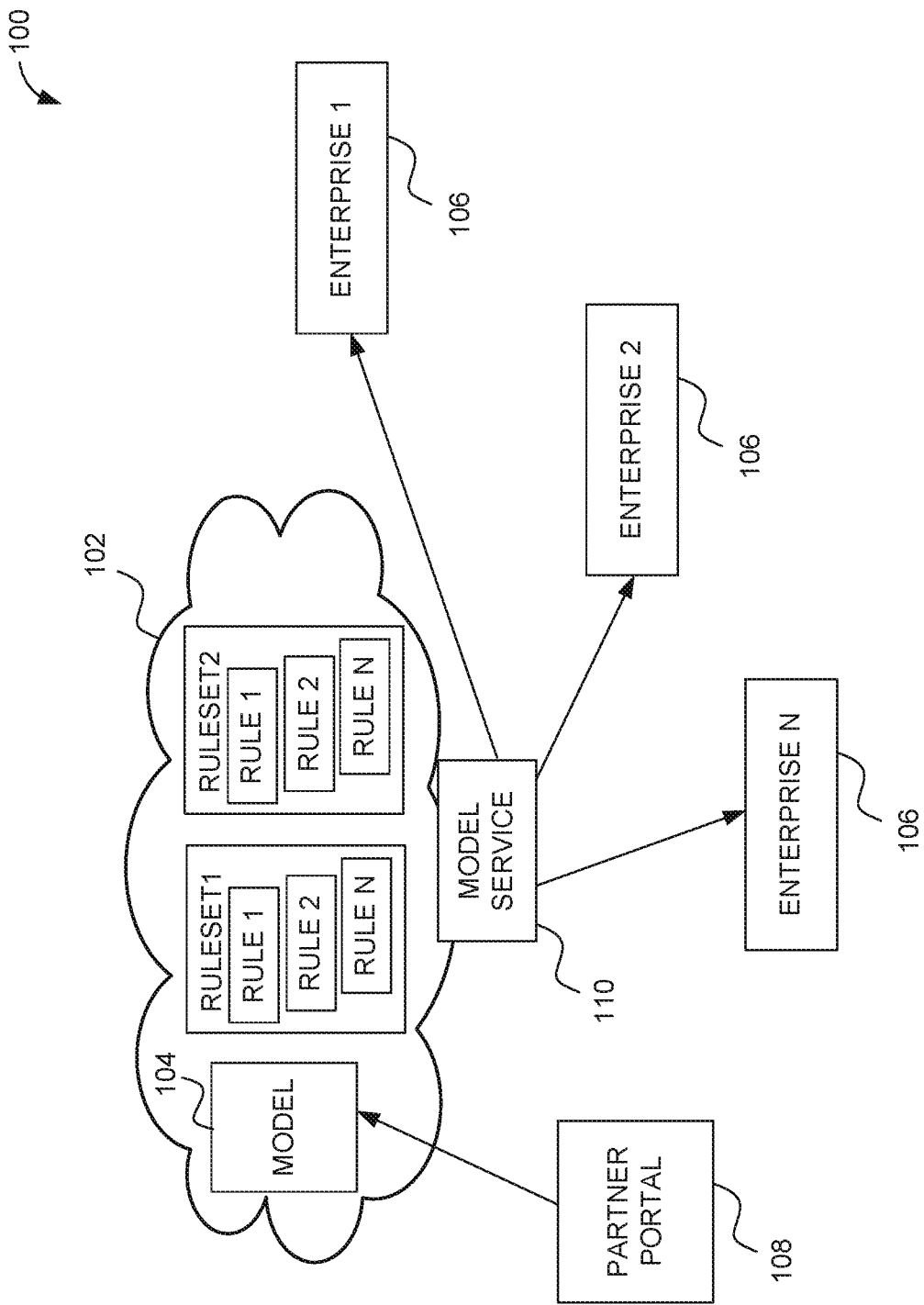
FIG. 1 is a diagram illustrating a network environment suitable for optimizing application or service experiences within an enterprise while maintaining privacy compliance through zero data exhaust, according to some example embodiments.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments are directed to a system and method that optimizes experiences with applications and services while maintaining privacy compliance of users within an enterprise. In example embodiments, each enterprise comprises a plurality of network-connected devices each having applications installed thereon and each having a trusted relationship in that enterprise. A model including one or more rules, actions, or messages are accessed by the enterprise from a centralized software service. A first set of users (referred to herein as "first cohort") is identified to receive the model and their actions tracked. Metrics that track the outcome of those actions are aggregated by a trusted metrics database at the enterprise. In some embodiments, the model may be revised based on the metrics. Based on the metrics, a second set of users (referred to herein at "second cohort") in the enterprise is identified and pushed the (revised) model. Thus, the first cohort is used to "test" the model and the second cohort (e.g., having similar attributes as the devices or users in the first cohort who responded positively to the test) subsequently receive the model based on the outcome of the test. The aggregated metrics is maintained at the enterprise and the analysis performed at the enterprise. As such, the model can be revised and/or provided to the second cohort without having to send any user data back to the centralized software service. This allows for optimization of application or service experiences while maintaining privacy compliance.

Thus, the present disclosure provides technical solutions for optimizing resource usage and/or experiences with an application or service (or usage of the application or service) at user devices of an enterprise while maintaining privacy compliance for users of those devices by keeping the outcome (e.g., metrics) at the enterprise (e.g., the metrics are not returned to the centralized software service). Use of example embodiments results in an improvement of device and/or application state along with associated power consumption, network bandwidth, and disk usage. Additionally, since the system intelligently determines which users (e.g., second cohort) should have which rules or models, the system avoids changing applications for those devices, applications, or users where there is little likelihood of benefit. Furthermore, the system keeps all user data within the enterprise (e.g., an enterprise trust boundary) and zero data is sent to the centralized software service (e.g., zero data exhaust) resulting in privacy compliance. Finally, the system allows for the separation of application models/rules/actions and application code/logic, thus incurring significantly less network bandwidth when using the models to optimize user/device state than would be the case otherwise.

FIG. 1 is a block diagram illustrating an example environment 100 for optimizing application or service experiences within an enterprise while maintaining privacy compliance through zero data exhaust, in accordance with example embodiments. In example embodiments, a centralized software service 102 (e.g., a cloud provider service) generates and provides a model 104 for one or more potential actions to be taken at an enterprise 106 (e.g., enterprise 1 106a, enterprise 2 106b, enterprise N 106c) with respect to an application or service. In some cases, the application or services are originally provided by the centralized software service 102. For example, the centralized software service 102 can be Microsoft.

In example embodiments, the model 104 comprises rules, actions, or messaging supplied by the central software service 102. In some cases, the model 104 may also comprise licensing terms that govern whether particular rules, actions, or metrics are applied that are dependent on a license state of the enterprise 106 to which the model 104 is provided. As such, the model 104 may comprise one or more rulesets (e.g., ruleset1, ruleset2) having different rules that are based on certain criteria, whereby each ruleset may drive a certain action based on the certain criteria. The action may include changing device or application state or may simply show the user a particular message. Other actions are also contemplated.

In some embodiments, a partner can provide, via a partner portal 108, certain criteria or optimization rules that are used in generating (or revising) the rulesets and/or the model. The partner comprises an entity that is a different organizational entity than the organization that is operating (e.g., hosting, running) the centralized software service 102. Similar to how the central software service 102 operates, the partners can remove features, change settings, adjust security, and so forth. Thus, the central software service 102 allows the model 104 to leverage rules and actions provided by partners by merging criteria, changes, and optimization rules from a partner with more general rules for the model 104. In some cases, the model 104 may be based on input from multiple partners or providers whereby each partner or provider has a license required for it to be executed.

The model service 110 hosts the generated model 104 at the central software service 102. The model service 110 can provide (e.g., push, transmit) the model 104 to the network-coupled enterprises 106 or the enterprises 106 can retrieve a copy of the model 104 from the model service 110.

In various embodiments, the centralized software service 102 is coupled to the enterprises 106 and the partner portal 108 via a communication network (not shown). One or more portions of the communication network may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the communication network may communicate information via a transmission or signal medium. As used herein, "transmission medium" refers to any intangible (e.g., transitory) medium that is capable of communicating (e.g., transmitting) data, and includes digital or analog communication signals or other intangible media to facilitate communication of such software.

In example embodiments, any of the systems or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

In alternative embodiments, some of the functions of the centralized software service 102 may be located elsewhere in the environment 100. Furthermore, the functions described herein for any single system or device may be subdivided among multiple systems or devices. Additionally, any number of centralized software services 102, partner portals 108, or enterprises 106 may be embodied within the network environment 100.

Further still, some components or functions of the network environment 100 may be combined or located elsewhere in the network environment 100.

Figure 2:
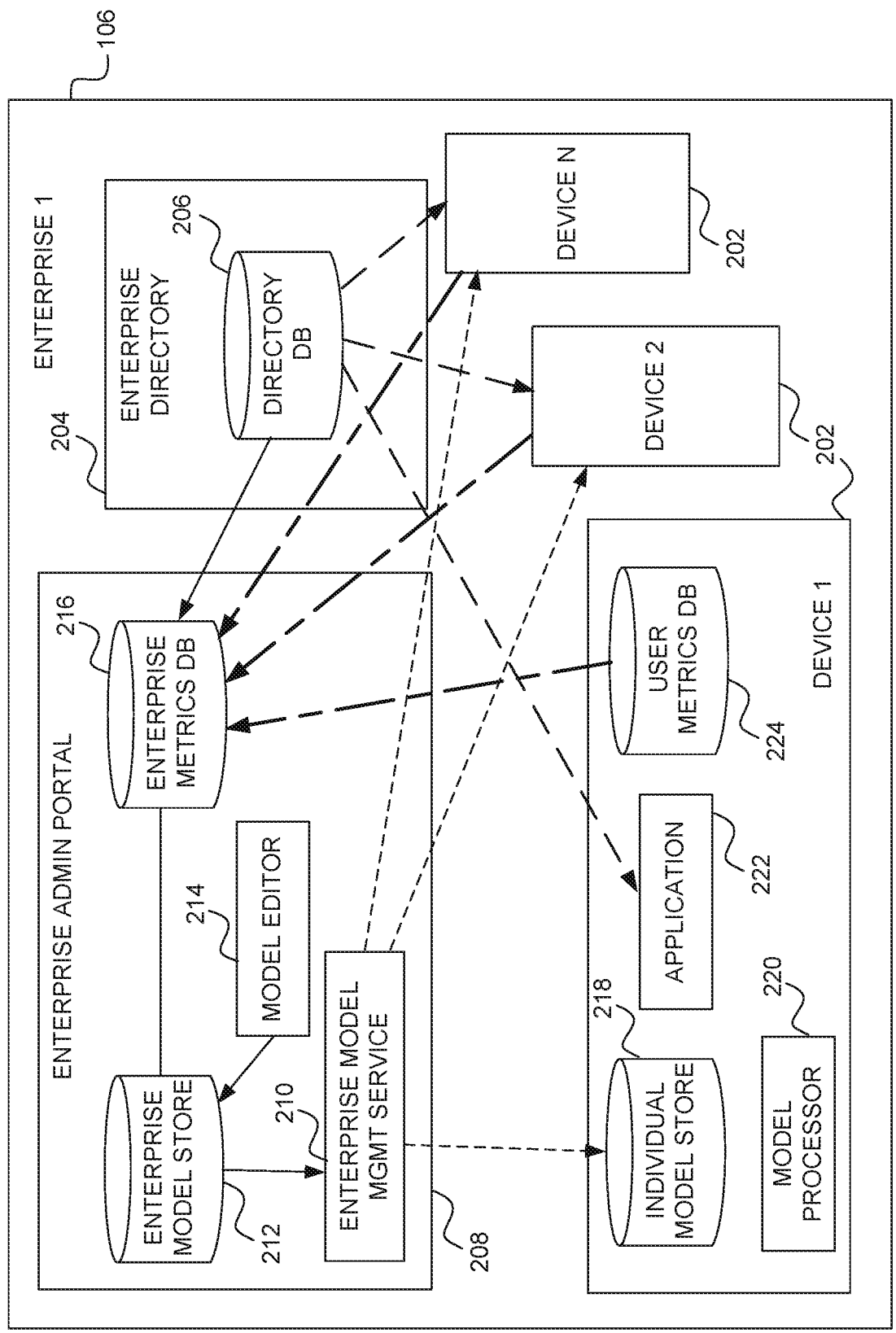
FIG. 2 is a block diagram illustrating components of an enterprise that are involved in optimizing application or service experiences within the enterprise, according to some example embodiments.

FIG. 2 is a block diagram illustrating components of the enterprise 106 that are involved in optimizing application and service experiences at the enterprise 106, according to example embodiments. The enterprise 106 comprises a network boundary having a plurality of network-connected devices 202 (and/or authenticated users using applications on such devices) that have a trusted relationship with the enterprise 106. The devices 202 may be connected through, for example, secure Internet or cloud Internet protocols.

Each of the devices 202 has applications installed thereon that may be optimized using example embodiments. It is noted that the term "enterprise" does not apply strictly to commercial organizations, but may also apply to governmental, educational, and/or non-governmental organizations—essentially any organization that confers a right for an information technology administrator to make decisions about its users' data.

In example embodiments, the enterprise 106 includes an enterprise directory 204 that comprises a list of device registrations of the devices 202 in the enterprise 106. In other embodiments, the list may be a list of employees registered within a corporate directory where the employees may use or more devices. The list is stored in a directory database 206 of the enterprise directory 204 and comprises information regarding the devices 202 and their users. In example embodiments, the enterprise directory 204 is used for determining groupings of users (e.g., cohorts) that will receive the model 104 (or a variant of the model 104). It is noted that registering and targeting devices 202 (for application of the model 104) may be based on authenticated users, registered in the enterprise directory 204, and signed into applications on the devices 202.

The enterprise 106 also comprises an enterprise administrative portal 208 that manages the model 104 at the enterprise 106. In some embodiments, the enterprise administrative portal 208 includes an enterprise model management service 210, an enterprise model store 212, a model editor 214, and an enterprise metrics database 216.

The enterprise model management service 210 periodically accesses (e.g., receives, retrieves, obtains) a copy of the model 104 from the centralized software service 102 and stores the model 104 at the enterprise model store 212.

In some embodiments, the enterprise model management service 210 may filter or modify the model 104 based on enterprise data. For example, the rule(s) within the model 104 may comprise various enterprise-level attributes such as industry or business size, licenses purchased, applications installed, geography, percentage of employees using only phones/tablets versus a full desktop computer, and so forth that may result in a modified version of the model 104 being generated at the enterprise 106. Thus, the enterprise-level configuration of the model 104 may modify the model 104 such that certain rules are enabled, disabled, and/or modified based on characteristics at an enterprise level such as the industry or size of the organization. If any of the rules in the model 104 came from partners (e.g., via the partner portal 108), a license check may be performed to confirm that the enterprise 106 has authorization to use their rules. In some embodiments, the license check is performed prior to the model 104 being passed from the centralized software service 102 to the enterprise 106, to ensure that any unlicensed rules are removed from the model 104. In other embodiments, license checking may be done when the enterprise model is pushed to the device 202 (e.g., in cases where the license is capped for N devices, rather than being a site-wide license).

The model editor 214 allows an operator or administrator of the enterprise 106 to manually edit or modify the model 104 prior to providing the model 104 to one or more devices 202 of the enterprise 106. For example, the operator or administrator may apply settings in the model editor 214 which are applied to the model 104.

In example embodiments, the enterprise model management service 210 examines the available devices 202 (or users) in the enterprise directory 204 to identify the first cohort to which the model 104 is provided. The first cohort comprises a small set of users on which the model may be "tested" before providing the model 104 (or the variant of the model 104) to a second cohort that has similar characteristics as members of the first cohort. The first cohort can be identified based one or more criteria such as geography, department, position in the organizational hierarchy, devices where the application is known to be frequently users or installed, device specification (as used by an employee), application installation, and/or usage metrics. The characteristics may be defined by criteria specified in the model rules, though in some embodiments an enterprise administrator may override or modify these criteria by modifying the rules.

Once the first cohort is identified, the devices 202 that are a part of the first cohort are provided the model 104 (e.g., pushed to the device 202 or retrieved by the device 202). The model 104 is stored within an individual model store 218 at each device 202. In some cases, there may be a 1:1 mapping between employees and devices. In other cases, only a subset of devices used by employees may be targeted.

A model processor 220 at the device 202 determines whether certain criteria are met before applying the rules of the model 104 to an application 222 at the device 202. In some cases, the model processor 220 applies the rules to determine which actions may be taken using data that may be present on the device 202 or dynamically retrieved.

Additionally or alternatively, the application 222 may wait for certain criteria in the model 104 to be met and then applies the rule(s) to determine which actions may be taken. In some cases, the model 104 may specify that only one rule or a subset of the rules may be applied at any given interval. In some instances, the user of the application 222 is presented with a message that provides the user with an opportunity to dismiss or block the action that will be performed based on the rule(s).

The application 222 then executes the action of the rule(s). The execution can, for example, cause display of text or a message, change a state of the application 222 or device 202, or modify data. For example, the message may indicate that the user can get more out of the application 222 by selecting an option to see the latest features. A result of the action is recorded, by the model processor 220, to a user metrics database 224. The results may indicate if the action taken was applied, dismissed, blocked, and so forth. For example, if a message was presented to the user, did the user act on the message or simply dismiss the message? Were certain technical criteria not met that blocked the action from being taken? More specific success may be determined using metrics defined in the model 104 for the rule(s) that were applied. In some cases, the user is offered an undo option for an automatically applied action.

In some embodiments, the model 104 or rule(s) are not automatically applied to the first or second cohort. For example, if the model 104 results in removing an application, the model 104 may be edited (e.g., by the model editor 214) to provide an option to the user of the device 202 to remove or retain the application.

The results (also referred to herein as "user metrics") at each device 202 are periodically provided from the user metrics database 224 to the enterprise metrics database 216. For example, the user metrics may be provided at a particular time of day, when a particular amount of user metrics is recorded, or when triggered by the model 104 or application 222. In other cases, the enterprise model management service 210 may trigger the retrieval of the user metrics from each device 202 of the first cohort. The results (e.g., feedback) after the model 104 has been applied to the first cohort may include, for example, measures of success, the action being blocked or dismissed, or the action being ignored by the user at a respective device 202.

The user metrics from the devices 202 of the first cohort are aggregated at the enterprise metrics database 216. The aggregated user metrics can then be combined with information from the enterprise directory 204 and analyzed. Crucially, from a privacy point of view, such analysis takes place within the enterprise data boundary, and the user metrics are not transmitted back to the cloud provider running the centralized software service 102.

In example embodiments, the enterprise model management service 210 periodically examines metrics for the rules and, based on criteria that may include time passed as well as total metrics received, determine a second cohort that should be created to receive the model 104. In one embodiment, the enterprise model management service 210 analyzes the aggregated user metrics to determine which users in the first cohort had a successful outcome; analyzes attributes of those first users such as department, job title, applications used; identifies a second cohort within the enterprise directory who share many of those attributes; and excludes the remaining cohort in the enterprise directory 204 who neither share many attributes nor were part of the first cohort.

For example, the enterprise 106 may comprise 50,000 devices/users and the first cohort may comprise five hundred devices 202 of the enterprise 106. If a threshold amount of success is achieved with the first cohort, then a second cohort can be identified that will also benefit from the model. For example, the enterprise model management service 210 can determine a degree of engagement with a message that was pushed (e.g., an action triggered by a rule) satisfies a threshold. The enterprise model management service 210 can then determine, based on various attributes (e.g., job title, machine type, roles) obtained from organization insights (e.g., from the enterprise directory 204), members of the second cohort (e.g., 20,000 devices or users) that have similar attributes and will be likely to benefit from the model or rule(s). In this example, the remaining devices 202 (e.g., 29,500 devices or users) are not pushed the model or rule(s) as these users will likely not benefit from the model or rule(s).

In some embodiments, the enterprise model management service 210 may take one or more actions to more intelligently apply the model or rule(s) to the second cohort. For example, the enterprise model management service 210 can split the first cohort into two groups—those that had a negative reaction to a given rule and those that had a positive reaction to the rule. The enterprise model management service 210 may then examine attributes of each of the groups (e.g., department, application installed/used, device characteristics). Based on this analysis, the enterprise model management service 210 may split the second cohort into two groups—users who are like the positive group of the first cohort and users who are like the negative group of the first cohort. In this situation, only the users who are like the positive group receive the model 104. This application of the model 104 optimizes for resource efficiency. However, certain organizations may want to optimize for consistency and may implement a threshold (e.g., 66%) above which 100% of devices in the enterprise 106 have the rule deployed. In some embodiments, the enterprise 106 gets a choice between consistency versus individualized efficiency. In other embodiments, one or the other behavior may be chosen.

In another example for intelligently applying the model to the second cohort, the enterprise model management service 210 can examine which rule(s) in the model 104 failed to reach a threshold for positivity for the first cohort. The enterprise model management service 210 can then remove those rule(s) to produce a new variant model. The new variant model is then provided to the second cohort. In a further embodiment, a combination of splitting the second cohort (as discussed above) and providing the variant model may be used. In some embodiments, the enterprise 106 can undo, with the first cohort, application of the rule(s) in the model 104 that failed to reach the positivity threshold.

By using this method to test a model on a small set of users before providing the model to a larger segment of the enterprise 106, application or service usage and experience can be optimized for the second cohort without providing the user metrics back to the centralized software service 102 for analysis, thus maintaining privacy compliance (e.g., zero data exhaust).

The enterprise 106 may also comprise other components (that are not shown) that are not pertinent to example embodiments. Furthermore, any one or more of the components (e.g., processors, service, stores) described herein may be implemented using hardware (e.g., a processor of a machine) or a combination of hardware and software. Moreover, any two or more of these components may be combined into a single component, and the functions described herein for a single component may be subdivided among multiple components.

Figure 3:
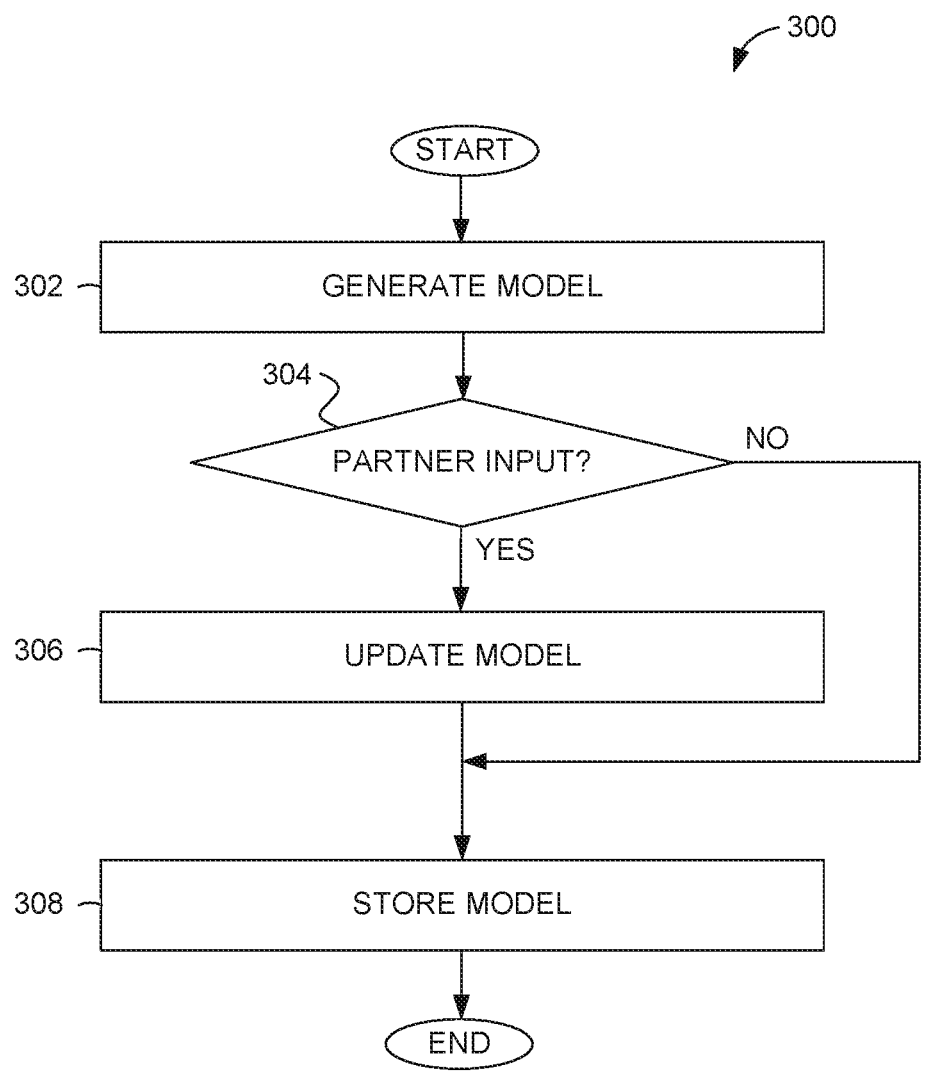
FIG. 3 is a flowchart illustrating operations of a method for optimizing application or service experiences performed at a centralized software service, according to some example embodiments.

FIG. 3 is a flowchart illustrating operations of a method 300 for optimizing application or service experiences at the centralized software service 102, according to some example embodiments. Operations in the method 300 may be performed by the centralized software service 102, using components described above with respect to FIG. 1. Accordingly, the method 300 is described by way of example with reference to the centralized software service 102. However, it shall be appreciated that at least some of the operations of the method 300 may be deployed on various other hardware configurations or be performed by similar components residing elsewhere in the network environment 100. Therefore, the method 300 is not intended to be limited to the centralized software service 102.

In operation 302, the central software service 102 generates the model. The model includes one or more rules, actions, or messages. In some embodiments, the model may also comprise licensing terms that govern whether particular rules, actions, or metrics are applied that are dependent on a license state of the enterprise 106 to which the model 104 is provided. In some cases, the model 104 comprises one or more rulesets whereby each ruleset may drive a certain action based on certain criteria. While certain embodiments may employ complex statistical or contextual modelling within rulesets, an example of a ruleset for illustrative purposes is as follows:

Ruleset: ID=101
Name "RemoveUnwantedApplications"
Comment: Uninstall advanced applications if user does not actively use them and they do not engage in activities to suggest they are likely to use them in the future.
Type: User-Productivity
Trigger: MSWindowsUnlock
Ruleset Threshold: [days-since-previous-notification]>1
Ruleset-scoring: Select-UpTo-2-Winners
Rule: ID=1

Scoring function 1: BOOL INVERSE [count-of-MSPowerPointFeatureUsage-ShapesInserted]
Scoring function 2: [count-of-MicrosoftVisio-Installed-Days]
Scoring function 3: BOOL INVERSE [count-of-MicrosoftVisio-Launches]
Scoring threshold: (SCORE1*SCORE2*SCORE3)>30
Action-type: App-Uninstall
Notification-contents: "Consider removing Microsoft Visio to increase disk space and reduce network bandwidth"
Action-contents: [remove-app:c:\program files\office\visio" ]
Target-Threshold-Minutes: 30
Target-Threshold-Metric: [MicrosoftVisio-Installed]=0
Rule: ID=2
Scoring function 1: BOOL INVERSE [count-of-MSExcel-ChartsInserted+count-of-MSExcel-FunctionsInserted]
Scoring function 2: [count-of-MicrosoftPowerBI-Installed-Days]
Scoring function 3: BOOL INVERSE [count-of-MicrosoftPowerBI-Launches]
Scoring threshold: (SCORE1*SCORE2*SCORE3)>30
Action-type: App-Uninstall
Notification-contents: "Consider removing Microsoft PowerBI to increase disk space and reduce network bandwidth"
Action-contents: [remove-app:c:\program files\office\visio" ]
Target-Threshold-Minutes: 30
Target-Threshold-Metric: [MicrosoftVisio-Installed]=0

In operation 304, a determination is made whether input is received from partners. If no input is received, then the method 300 goes to operation 308. However, if input is received from one or more partners, the method goes to operation 306 where the model 104 is updated or revised. The partner can provide, via the partner portal 108, certain criteria or optimization rules that are used in generating or modifying the ruleset and/or model 104. Additionally, the partners can remove features, change settings, adjust security, and so forth. Thus, the central software service 102 allows the model 104 to leverage rules and actions provided by one or more partners by merging criteria, changes, and optimization rules from partner(s) with more general rules for the model 104. In some embodiments, the model 104 is generated after receiving the partner input, thus not requiring an update to the (existing) model 104.

In operation 308, the model 104 is stored and ready for access by one or more network-coupled enterprises 106. In example embodiments, the model service 110 contains the model 104 at the central software service 102. The model service 110 can transmit a copy of the model 104 to the network-coupled enterprises 106 or the enterprises 106 can retrieve a copy of the model 104 from the model service 110.

Figure 4:
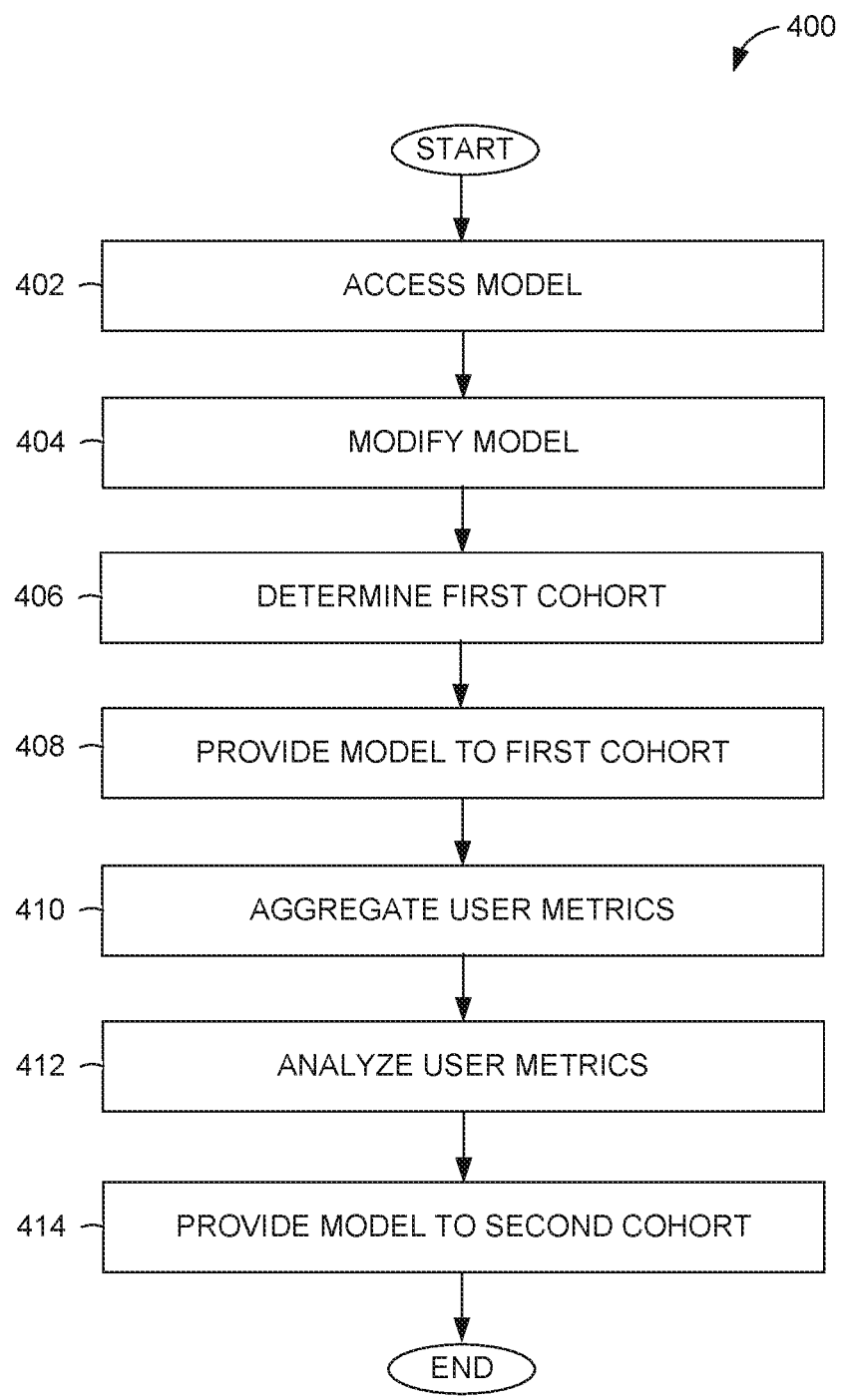
FIG. 4 is a flowchart illustrating operations of a method for optimizing application or service experiences performed at an enterprise, according to some example embodiments.

FIG. 4 is a flowchart illustrating operations of a method 400 for optimizing application or service experiences at the enterprise 106, according to some example embodiments. Operations in the method 400 may be performed by the enterprise 106, using components described above with respect to FIG. 2. Accordingly, the method 400 is described by way of example with reference to the enterprise 106. However, it shall be appreciated that at least some of the operations of the method 400 may be deployed on various other hardware configurations or be performed by similar components residing elsewhere in the network environment 100. Therefore, the method 400 is not intended to be limited to the enterprise 106.

In operation 402, the enterprise 106 accesses the model 104. In example embodiments, the enterprise model management service 210 accesses (e.g., receives, retrieves, obtains) a copy of the model 104 from the centralized software service 102 and stores the model 104 at the enterprise model store 212.

In operation 404, the model 104 may be modified by an operator or an administrator of the enterprise 106. In example embodiments, the model editor 214 allows the operator or administrator of the enterprise 106 to edit the model 104 prior to the model 104 being provided (e.g., pushed) to one or more devices 202 of the enterprise 106.

Additionally, the rules within the model 104 may comprise various enterprise-level attributes such as industry or business size, that may result in a modified version of the model being generated (e.g., automatically modified by the enterprise model management service 210) at the enterprise 106. License verification may enable or disable certain rules in the model where they are provided by partners or offered at a premium cost by the centralized software service 102.

In operation 406, the enterprise model management service 210 determines the first cohort to which the model will be provided. In example embodiments, the enterprise model management service 210 examines the available devices 202 (or users) in the enterprise directory 204 to identify the first cohort. The first cohort can be identified based one or more attributes such as geography, department, device specification, application installation, and/or usage metrics.

In operation 408, the model 104 is provided to devices 202 that are a part of the first cohort (e.g., pushed to the device 202 or retrieved by the device 202). The model 104 is stored within the individual model store 218 at each device 202. The model processor 220 at the device 202 determines whether certain criteria are met before applying one or more rules of the model 104 to the application 222 at the device 202. The application 222 then executes the action on the rule(s). The execution can, for example, cause display of text or a message, change a state of the application 222 or device 202, or modify data. In some cases, the execution can also include deletion of the application 222. A result of the action (e.g., user metric(s)) is recorded, by the model processor 220, to a user metrics database 224. The results may indicate if the action taken was applied, dismissed, blocked, and so forth. In some cases, the results include a behavior of the user (e.g., ignored message, selected option to apply or delete).

In operation 410, the user metrics from each of the devices 202 in the first cohort are aggregated at the enterprise metrics database 216. The aggregation can occur at a predetermined time, when a particular amount of user metrics is recorded or stored at the device 202, when triggered by the model 104 or the application 222, or when triggered by the enterprise model management service 210.

In operation 412, the aggregated user metrics are analyzed. Analysis includes determining a second cohort to receive the model 104 or a variant of the model 104. Operation 412 will be discussed in more detail in connection with FIG. 5 below.

In operation 414, the model 104 is provided to the second cohort. In some cases, the model 104 may be the variant of the model 104 provided to the first cohort based on an outcome of the analyzing operation 412.

Figure 5:
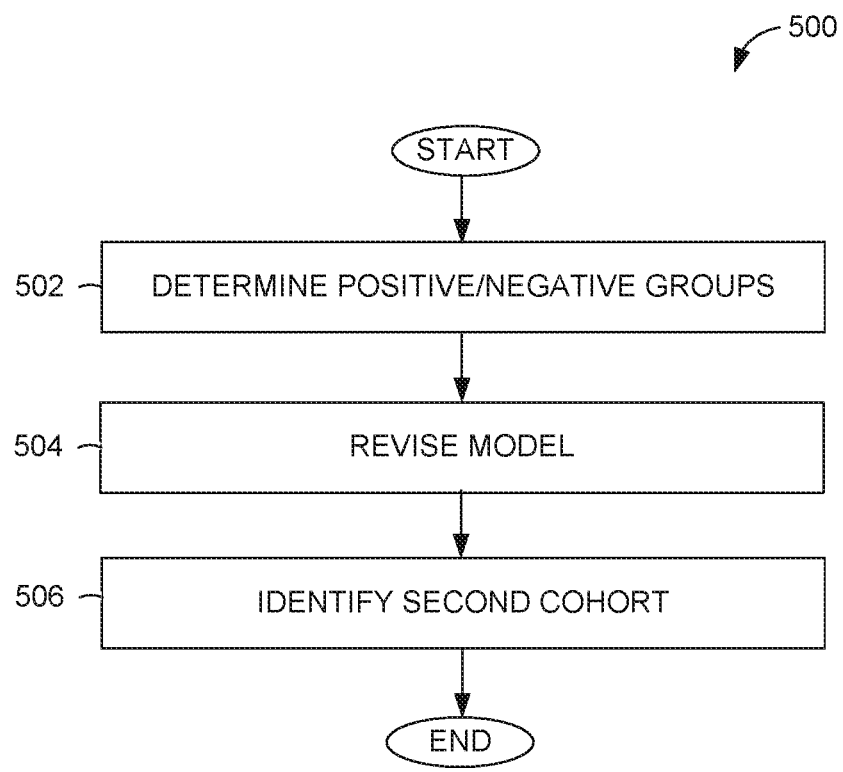
FIG. 5 is a flowchart illustrating operations of a method for analyzing aggregated user metrics at the enterprise, according to some example embodiments.

FIG. 5 is a flowchart illustrating operations of a method 500 for analyzing the aggregated user metrics at the enterprise 106 (e.g., operation 412), according to some example embodiments. Operations in the method 500 may be performed by the enterprise 106 (e.g., the enterprise administrative portal 208), using components described above with respect to FIG. 2. Accordingly, the method 500 is described by way of example with reference to the enterprise 106. However, it shall be appreciated that at least some of the operations of the method 500 may be deployed on various other hardware configurations or be performed by similar components residing elsewhere in the network environment 100. Therefore, the method 500 is not intended to be limited to the enterprise 106.

In operation 502, the enterprise model management service 210 determines positive and negative groups within the first cohort based on the aggregated user metrics. For example, the enterprise model management service 210 can split the first cohort into two groups—those that had a negative reaction to a given rule in the model 104 and those that had a positive reaction to the rule. The enterprise model management service 210 may then examine attributes of each of the groups (e.g., department, application installed/used, device characteristics) to determine commonalities.

In operation 504, the enterprise model management service 210 can revise the model 104 based on the aggregated user metrics. In example embodiments, the enterprise model management service 210 examines which rule(s) in the model 104 failed to reach a threshold for positivity for the first cohort. The enterprise model management service 210 can then remove (or modify) those rule(s) to produce a new variant model. The new variant model can then be provided to the second cohort. Alternately, if the ruleset did not reach a sufficiently positive result, the ruleset may no longer be run on any devices within the enterprise 106. This achieves the overall system goal of ensuring that minimal resources (e.g., devices 202) are used to make a decision about whether optimization is beneficial to that organization or enterprise 106.

In operation 506, the enterprise model management service 210 identifies the second cohort. In some embodiments, the enterprise model management service 210 examines the aggregated user metrics for the model 104 and, based on criteria that may include time passed as well as total metrics received, determines the second cohort that should be created to receive the model 104. In one embodiment, the enterprise model management service 210 identifies all devices 202 (or users) in the enterprise directory 204 that were not a part of the first cohort. This set of devices 202 can constitute the second cohort. Further still, based on this analysis in operation 502, the enterprise model management service 210 can split the second cohort into two groups—users who are like the positive group of the first cohort and users who are like the negative group of the first cohort. In this situation, only the users who are like the positive group receive the model 104 (or the variant of the model 104).

In other embodiments, the enterprise model management service 210 determines the second cohort by identifying devices 202 (or users) that have similar attributes or characteristics to devices 202 (or users) of the first cohort for which positive results were received by the application of the model. For example, the enterprise model management service 210 can determine a degree of engagement with a message that was pushed (e.g., an action triggered by a rule) that satisfies a threshold. The enterprise model management service 210 can then determine, based on various attributes (e.g., job title, machine type, roles) obtained from organization insights (e.g., from the enterprise directory 204), members of the second cohort that have similar attributes and will be likely to benefit from the model or rule(s). Remaining non-selected devices comprise a separate (third) cohort that do not receive the model 104.

Figure 6:
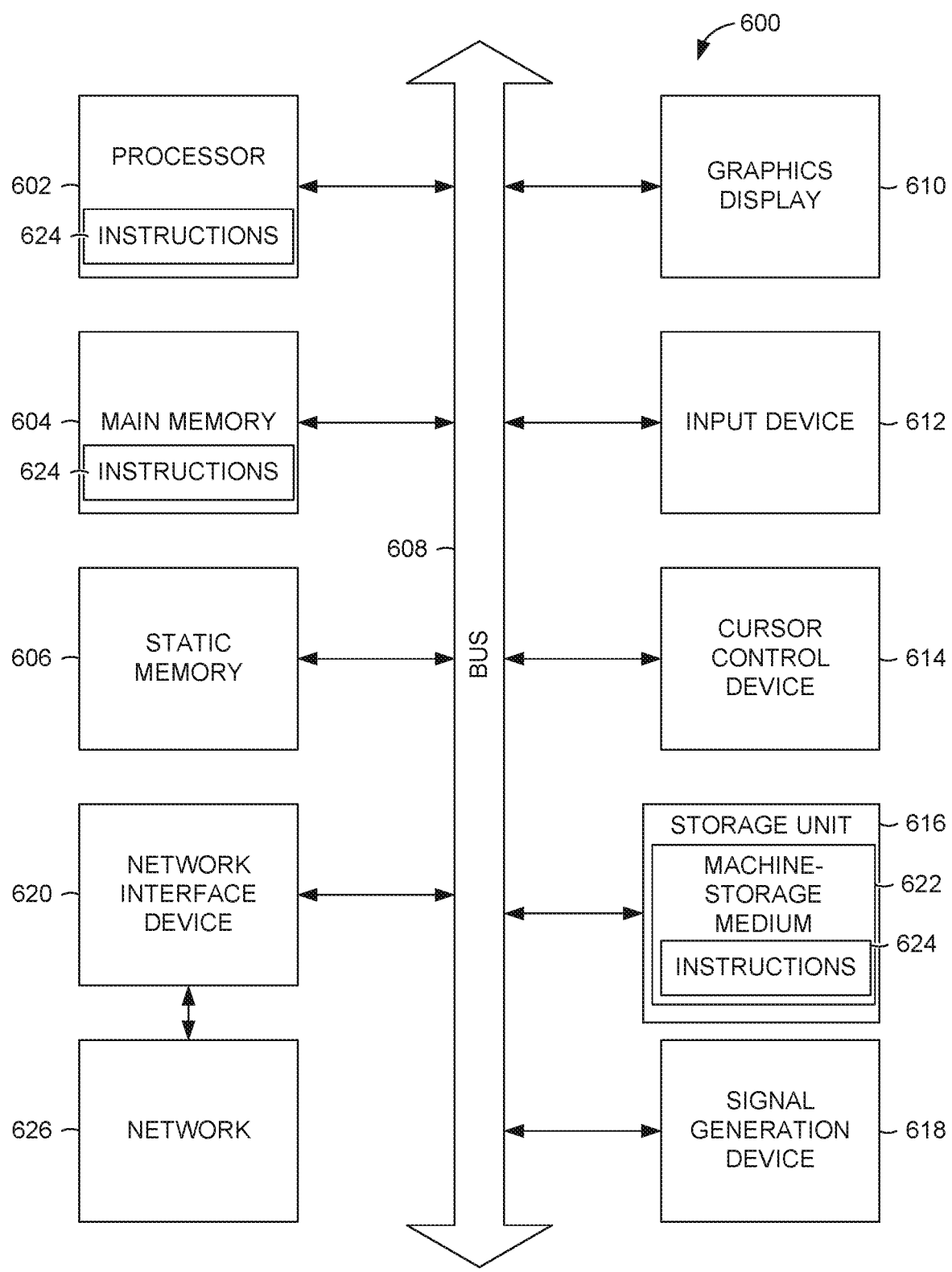
FIG. 6 is a block diagram illustrating components of a machine, according to some example embodiments, able to read instructions from a machine-storage medium and perform any one or more of the methodologies discussed herein.

FIG. 6 illustrates components of a machine 600, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIG. 4 and FIG. 5. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 1002 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-storage media (e.g., tangible and non-transitory machine-storage media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 622 (or equivalent "storage medium") specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for optimizing application experiences on devices of an enterprise while maintaining privacy compliance. The method comprises accessing, by an enterprise model management service of an enterprise from a centralized software service, a model comprising one or more rules to be applied to an application or service; providing, by the enterprise model management service, the model to each device of a first cohort at the enterprise, a rule of the one or more rules causing an action associated with the application to occur at each device; aggregating, in an enterprise metrics database, user metrics associated with the action at each device of the first cohort, the user metrics indicating a result of the action at each device of the first cohort; analyzing, by the enterprise model management service, the aggregated user metrics, the analyzing including determining a second cohort at the enterprise; and providing, by the enterprise model management service, the model to devices of at least a portion of the second cohort.

In example 2, the subject matter of example 1 can optionally include revising the model prior to providing the model to the first cohort based on enterprise-level attributes associated with the model, the revising comprising enabling, disabling, or modifying at least one rule of the model.

In example 3, the subject matter of any of examples 1-2 can optionally include receiving, via a model editor at the enterprise, one or more edits to the model; and based on the received one or more edits, modifying the model prior to providing the model to each device of the first cohort.

In example 4, the subject matter of any of examples 1-3 can optionally include determining the first cohort comprises selecting devices based on one or more attributes associated with each user of the devices, the attributes comprising one or more of geography, department, device specification, application installation, usage metrics, or position in organization.

In example 5, the subject matter of any of examples 1-4 can optionally include wherein the model is generated by the centralized software service by merging input from one or more partners with general rules of the centralized software service and performing a license check to confirm that the enterprise has authorization to use rules associated with the one or more partners.

In example 6, the subject matter of any of examples 1-5 can optionally include wherein the analyzing comprises splitting the first cohort into a negative group that has a negative result to the at least one rule of the model and a positive group that had a positive result to the at least one rule of the model; examining attributes of the negative group and the positive group; and based on the attributes of the negative group and the positive group, splitting the second cohort into a first group that has similar attributes as the negative group and a second group that has similar attributed as the positive group, the second group being provided the model.

In example 7, the subject matter of any of examples 1-6 can optionally include wherein the analyzing comprises determining a rule in the model that failed to reach a positivity threshold; removing the rule from the model to derive a variant model, wherein the providing the model to devices of at least the portion of the second cohort comprises providing the variant model; and undoing, with the first cohort, application of the rule in the model that failed to reach the positivity threshold.

In example 8, the subject matter of any of examples 1-7 can optionally include wherein the action associated with the application comprises one or more of changing a device state, changing an application state, modifying data, or displaying a message.

In example 9, the subject matter of any of examples 1-8 can optionally include causing display of a message to a user of each device providing an option to block or dismiss the action or to take explicit steps to enable the action.

Example 10 is a system for optimizing application experiences on devices in an enterprise while maintaining privacy compliance. The system includes one or more processors and a storage device storing instructions that, when executed by the one or more hardware processors, causes the one or more hardware processors to perform operations comprising accessing, by an enterprise model management service of an enterprise from a centralized software service, a model comprising one or more rules to be applied to an application or service; providing, by the enterprise model management service, the model to each device of a first cohort at the enterprise, a rule of the one or more rules causing an action associated with the application to occur at each device; aggregating, in an enterprise metrics database, user metrics associated with the action at each device of the first cohort, the user metrics indicating a result of the action at each device of the first cohort; analyzing, by the enterprise model management service, the aggregated user metrics, the analyzing including determining a second cohort at the enterprise; and providing, by the enterprise model management service, the model to devices of at least a portion of the second cohort.

In example 11, the subject matter of example 10 can optionally include revising the model prior to providing the model to the first cohort based on enterprise-level attributes associated with the model, the revising comprising enabling, disabling, or modifying at least one rule of the model.

In example 12, the subject matter of any of examples 10-11 can optionally include receiving, via a model editor at the enterprise, one or more edits to the model; and based on the received one or more edits, modifying the model prior to providing the model to each device of the first cohort.

In example 13, the subject matter of any of examples 10-12 can optionally include wherein the determining the first cohort comprises selecting devices based on one or more attributes associated with each user of the devices, the attributes comprising one or more of geography, department, device specification, application installation, usage metrics, or position in organization.

In example 14, the subject matter of any of examples 10-13 can optionally include wherein the model is generated by the centralized software service by merging input from one or more partners with general rules of the centralized software service and performing a license check to confirm that the enterprise has authorization to use rules associated with the one or more partners.

In example 15, the subject matter of any of examples 10-14 can optionally include wherein the analyzing comprises splitting the first cohort into a negative group that has a negative result to the at least one rule of the model and a positive group that had a positive result to the at least one rule of the model; examining attributes of the negative group and the positive group; and based on the attributes of the negative group and the positive group, splitting the second cohort into a first group that has similar attributes as the negative group and a second group that has similar attributed as the positive group, the second group being provided the model.

In example 16, the subject matter of any of examples 10-15 can optionally include wherein the analyzing comprises determining a rule in the model that failed to reach a positivity threshold; removing the rule from the model to derive a variant model, wherein the providing the model to devices of at least the portion of the second cohort comprises providing the variant model; and undoing, with the first cohort, application of the rule in the model that failed to reach the positivity threshold.

In example 17, the subject matter of any of examples 10-16 can optionally include wherein the action associated with the application comprises one or more of changing a device state, changing an application state, modifying data, or displaying a message.

In example 18, the subject matter of any of examples 10-17 can optionally include causing display of a message to a user of each device providing an option to block or dismiss the action or to take explicit steps to enable the action.

Example 19 is a machine-storage medium storing instructions for optimizing experiences with applications on devices in an enterprise while maintaining privacy compliance. The machine-storage medium configures one or more processors to perform operations comprising accessing, by an enterprise model management service of an enterprise from a centralized software service, a model comprising one or more rules to be applied to an application or service; providing, by the enterprise model management service, the model to each device of a first cohort at the enterprise, a rule of the one or more rules causing an action associated with the application to occur at each device; aggregating, in an enterprise metrics database, user metrics associated with the action at each device of the first cohort, the user metrics indicating a result of the action at each device of the first cohort; analyzing, by the enterprise model management service, the aggregated user metrics, the analyzing including determining a second cohort at the enterprise; and providing, by the enterprise model management service, the model to devices of at least a portion of the second cohort.

In example 20, the subject matter of example 19 can optionally include revising the model prior to providing the model to the first cohort based on enterprise-level attributes associated with the model, the revising comprising enabling, disabling, or modifying at least one rule of the model.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements." "symbols," "characters," "terms." "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   accessing, by an enterprise model management service of an enterprise from a centralized software service, a model comprising one or more rules to be applied to an application or service;
   providing, by the enterprise model management service, the model to each device of a first cohort at the enterprise to test the model, a rule of the one or more rules causing an action associated with the application to occur at each device;
   responsive to providing the model, aggregating, in an enterprise metrics database, user metrics associated with the action at each device of the first cohort, the user metrics indicating a result of the action at each device of the first cohort;
   analyzing, by the enterprise model management service, the aggregated user metrics, the analyzing occurring within an enterprise data boundary of the enterprise and excludes transmission of the aggregated user metrics back to the centralized software service to maintain privacy compliance, the analyzing including determining a second cohort at the enterprise that comprises a different set of users than the first cohort, at least a portion of the second cohort having similar characteristics as members of the first cohort for which the aggregated user metrics indicated positive results; and
   based on the analyzing, providing, by the enterprise model management service, the model to devices of at least the portion of the second cohort.

2. The method of claim 1, further comprising revising the model prior to providing the model to the first cohort based on enterprise-level attributes associated with the model, the revising comprising enabling, disabling, or modifying at least one rule of the model.

3. The method of claim 1, further comprising:
   receiving, via a model editor at the enterprise, one or more edits to the model; and
   based on the received one or more edits, modifying the model prior to providing the model to each device of the first cohort.

4. The method of claim 1, further comprising determining the first cohort comprises selecting devices based on one or more attributes associated with each user of the devices, the attributes comprising one or more of geography, department, device specification, application installation, usage metrics, or position in organization.

5. The method of claim 1, wherein the model is generated by the centralized software service by merging input from one or more partners with general rules of the centralized software service and performing a license check to confirm that the enterprise has authorization to use rules associated with the one or more partners.

6. The method of claim 1, wherein the analyzing comprises:
   splitting the first cohort into a negative group that has a negative result to the at least one rule of the model and a positive group that had a positive result to the at least one rule of the model;
   examining attributes of the negative group and the positive group; and
   based on the attributes of the negative group and the positive group, splitting the second cohort into a first group that has similar attributes as the negative group and a second group that has similar attributes as the positive group, the second group being provided the model.

7. The method of claim 1, wherein the analyzing comprises:

determining a rule in the model that failed to reach a positivity threshold;

removing the rule from the model to derive a variant model, wherein the providing the model to devices of at least the portion of the second cohort comprises providing the variant model; and undoing, with the first cohort, application of the rule in the model that failed to reach the positivity threshold.

8. The method of claim 1, wherein the action associated with the application comprises one or more of changing a device state, changing an application state, modifying data, or displaying a message.

9. The method of claim 1, further comprising causing display of a message to a user of each device providing an option to block or dismiss the action or to take explicit steps to enable the action.

10. A system comprising:
one or more hardware processors; and
a storage device storing instructions that, when executed by the one or more hardware processors, causes the one or more hardware processors to perform operations comprising:
accessing, by an enterprise model management service of an enterprise from a centralized software service, a model comprising one or more rules to be applied to an application or service;
providing, by the enterprise model management service, the model to each device of a first cohort at the enterprise to test the model, a rule of the one or more rules causing an action associated with the application to occur at each device;
responsive to providing the model, aggregating, in an enterprise metrics database, user metrics associated with the action at each device of the first cohort, the user metrics indicating a result of the action at each device of the first cohort;
analyzing, by the enterprise model management service, the aggregated user metrics, the analyzing occurring within an enterprise data boundary of the enterprise and excludes transmission of the aggregated user metrics back to the centralized software service to maintain privacy compliance, the analyzing including determining a second cohort at the enterprise that comprises a different set of users than the first cohort, at least a portion of the second cohort having similar characteristics as members of the first cohort for which the aggregated user metrics indicated positive results; and
based on the analyzing, providing, by the enterprise model management service, the model to devices of at least the portion of the second cohort.

11. The system of claim 10, wherein the operations further comprise revising the model prior to providing the model to the first cohort based on enterprise-level attributes associated with the model, the revising comprising enabling, disabling, or modifying at least one rule of the model.

12. The system of claim 10, wherein the operations further comprise:
receiving, via a model editor at the enterprise, one or more edits to the model; and
based on the received one or more edits, modifying the model prior to providing the model to each device of the first cohort.

13. The system of claim 10, wherein the determining the first cohort comprises selecting devices based on one or more attributes associated with each user of the devices, the attributes comprising one or more of geography, department, device specification, application installation, usage metrics, or position in organization.

14. The system of claim 10, wherein the model is generated by the centralized software service by merging input from one or more partners with general rules of the centralized software service and performing a license check to confirm that the enterprise has authorization to use rules associated with the one or more partners.

15. The system of claim 10, wherein the analyzing comprises:
splitting the first cohort into a negative group that has a negative result to the at least one rule of the model and a positive group that had a positive result to the at least one rule of the model;
examining attributes of the negative group and the positive group; and
based on the attributes of the negative group and the positive group, splitting the second cohort into a first group that has similar attributes as the negative group and a second group that has similar attributes as the positive group, the second group being provided the model.

16. The system of claim 10, wherein the analyzing comprises:
determining a rule in the model that failed to reach a positivity threshold;
removing the rule from the model to derive a variant model, wherein the providing the model to devices of at least the portion of the second cohort comprises providing the variant model; and
undoing, with the first cohort, application of the rule in the model that failed to reach the positivity threshold.

17. The system of claim 10, wherein the action associated with the application comprises one or more of changing a device state, changing an application state, modifying data, or displaying a message.

18. The system of claim 10, wherein the operations further comprise causing display of a message to a user of each device providing an option to block or dismiss the action or to take explicit steps to enable the action.

19. A machine-storage medium storing instructions that, when executed by one or more processors of a machine, cause the one or more processors to perform operations comprising:
accessing, by an enterprise model management service of an enterprise from a centralized software service, a model comprising one or more rules to be applied to an application or service;
providing, by the enterprise model management service, the model to each device of a first cohort at the enterprise to test the model, a rule of the one or more rules causing an action associated with the application to occur at each device;
responsive to providing the model, aggregating, in an enterprise metrics database, user metrics associated with the action at each device of the first cohort, the user metrics indicating a result of the action at each device of the first cohort;
analyzing, by the enterprise model management service, the aggregated user metrics, the analyzing occurring within an enterprise data boundary of the enterprise and excludes transmission of the aggregated user metrics back to the centralized software service to maintain privacy compliance, the analyzing including determining a second cohort at the enterprise that comprises a different set of users than the first cohort, at least a portion of the second cohort having similar characteristics as members of the first cohort for which the aggregated user metrics indicated positive results; and based on the analyzing, providing, by the enterprise model management service, the model to devices of at least the portion of the second cohort.

20. The machine-storage medium of claim 19, wherein the operations further comprise revising the model prior to providing the model to the first cohort based on enterprise-level attributes associated with the model, the revising comprising enabling, disabling, or modifying at least one rule of the model.

* * * * *